J. P. VAN VLECK.
Hand Seeder.
No. 62,380.
Patented Feb. 26, 1867.
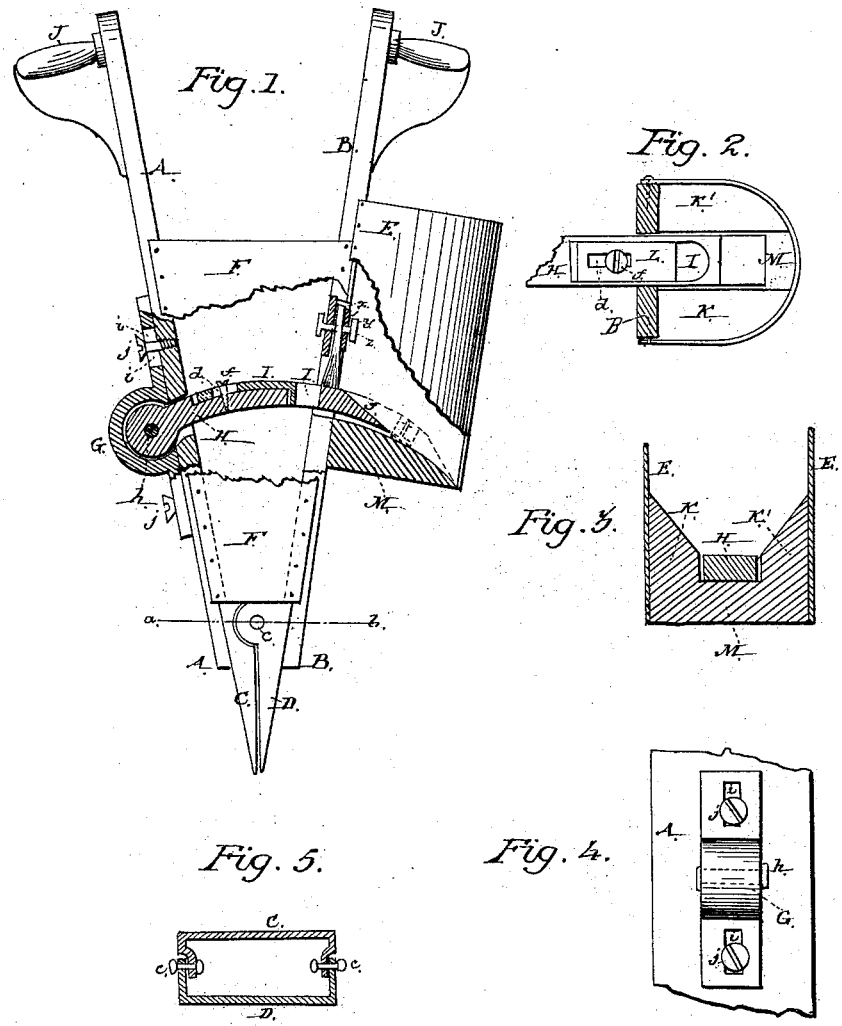

United States Patent Office.

JOHN P. VAN VLECK, OF ROCK COUNTY, WISCONSIN.

Letters Patent No. 62,380, dated February 26, 1867.

IMPROVEMENT IN HAND CORN PLANTERS.

The Schedule referred to in these Letters Patent and making part of the same.

TO WHOM IT MAY CONCERN:

Be it known that I, JOHN P. VAN VLECK, of Rock county, and State of Wisconsin, have invented a new and useful Machine for Planting Corn and other seeds; and I do hereby declare that the following is a full, clear, and exact description thereof, reference being had to the accompanying drawings, making part of this specification, the same letters of reference indicating the same part in each figure.

The nature of my invention consists in making the seed-cup bar in a circular or curved form, so as to fit a curved bottom of a hopper; also in hinging or pivoting the rear end of the seed-cup bar to a movable bearing to secure the fitting the forward end of the bar to the bottom of the hopper as it becomes worn; also in bevelling the upper side of the forward end of the bar to cause it to act as a plough to keep the seed in the bottom of the hopper from packing, and to insure the filling of the seed-cup; also in bevelling the bottom of the hopper towards the channel in the centre of the bottom of the hopper in which the bar is worked, which, with the bevelled point of the bar, keeps the seed in a lively state, and prevents its packing, to which it is liable if it is damp or mixed with chaff or foreign substances.

Figure 1 is an elevation, with a portion broken away to show a part of the mechanism cut longitudinally through its centre.

Figure 2 is a top view of the hopper bottom, seed-cup bar, seed-cup, and sliding-plate to regulate the amount of seed desired in the cup.

Figure 3 is a sectional view of a hopper bottom at right angles with fig. 2.

Figure 4 is a view of a movable bearing at right angles with it, as shown in fig. 1; also shows a mode of attaching it to the framework of the planter.

Figure 5 is a cross-section of the metallic points of the planter, from $a$ to $b$ in fig. 1, being at right angles therewith, and is a vertical view.

A and B are parts of my planter to which are attached hopper E, bearing G, and seed-cup bar H; also the covering F, of cloth or other suitable elastic material. At the lower ends of A and B are the metallic hollow plates C and D, hinged or pivoted at $c$. These plates are rigidly attached to A and B, and the pivots $c$ act as fulcra, opening their points as the tops of A and B, to which handles, J, may be attached, are moved towards each other, depositing the seed which has fallen from the seed-cup I (into the cavity made by the plates when closed) into the soil, into which the points of the plates have been thrust. H is a curved seed-cup bar, hinged by pivot $h$ to a movable bearing, G. The seed-cup I is contracted or enlarged in its capacity by means of slide L, and by means of slot $d$ and screw $f$ the slide is held in place as desired. The brush V is held in place by plate $x$, bolt $z$, and nut $y$, and serves the usual purposes of a brush cut-off when the cup is filled. At $g$ is the bevel on the upper side of the end of the seed-cup bar to plough underneath the grain as the parts A and B are carried together, enlivening and keeping in motion the grain as it moves forward on the bottom M, and between the bevelled sides K and K'; and as the seed-cup bar is drawn back the grain gravitates towards the bottom M, down the incline or bevel sides K and K', thus keeping the grain in constant motion. This I deem of great value, for while the grain is kept in a lively condition it cannot pack and prevent the filling the seed-cup, even though the grain may be damp or mixed with chaff or foreign substances. The movable bearing G, I also deem important, as, by the slots $i$ and screws $j$, it can be moved longitudinally to cause the forward end of the seed-cup bar to fit properly the bottom M of the hopper, especially when the end of the bar has become worn on its under side. The hollow, tapering points or blades C and D, hinged by pivots $c$, are of great value, as they effectually prevent the usual great trouble of leaking or slobbering and wasting the grain as the machine is used. The adjustability of the seed-cup bar, its curved form, its forward end formed so as to plough up the grain in the bottom of the hopper, the bevelled or inclined sides of the hopper, and the hollow tapering points or blades, pivoted to operate as described, I deem indespensable to the perfect working of a seed planter. It may also be observed that in my planter the operator can always readily see inside the machine at the exact time the seed should drop from the cup, and thus know whether or not, for any cause, there has been a failure of the delivery of the seed from the cup into the hollow points or blades for depositing in the ground.

I am aware that pivoted legs, cloth sides, a seed-box and slide, are parts common in hand corn planters, particularly as described in a patent granted to Jacob Morris, dated June 13, 1865, and I do not claim those parts independently of my improvements therein and additions thereto; but what I do claim as my invention, and desire to secure by Letters Patent, is—

1. Curved seed-cup bar H, in combination with hopper E, when both are constructed and operated substantially as and for the purposes described.

2. A general arrangement of the parts A, B, E, F, C, D, H, and G, when the whole are constructed, combined, and operated substantially as and for the purposes described.

JOHN P. VAN VLECK.

Witnesses:
GEORGE PEIRCE,
MICHAEL A. OTT.